United States Patent
Kohl

[11] Patent Number: 6,126,249
[45] Date of Patent: Oct. 3, 2000

[54] BRAKE PRESSURE CONTROL DEVICES

[75] Inventor: Andreas Kohl, Mainz, Germany

[73] Assignee: ITT Manufacturing Enterprises, Inc., Wilmington, Del.

[21] Appl. No.: 09/117,191

[22] PCT Filed: Jan. 16, 1997

[86] PCT No.: PCT/EP97/00179

§ 371 Date: Apr. 19, 1999

§ 102(e) Date: Apr. 19, 1999

[87] PCT Pub. No.: WO97/27093

PCT Pub. Date: Jul. 31, 1997

[30] Foreign Application Priority Data

Jan. 24, 1996 [DE] Germany .............. 196 02 363

[51] Int. Cl.[7] .............. B60T 8/48; B60T 8/40; B60T 13/14; B60T 13/66
[52] U.S. Cl. .............. 303/116.1; 303/10; 303/DIG. 11; 303/DIG. 3; 303/113.4; 303/11; 303/115.1
[58] Field of Search .............. 303/116.1, 116.2, 303/116.4, DIG. 3, DIG. 4, 10, 11, 166, 167, 113.4, 122.12, 122.13, 68, DIG. 11, 119.1, 115.1, 115.2, 115.3, 115.4

[56] References Cited

U.S. PATENT DOCUMENTS

| 5,248,189 | 9/1993 | Izumi et al. . |
| 5,277,483 | 1/1994 | Yosida et al. . |
| 5,743,598 | 4/1998 | Toda et al. .............. 303/DIG. 4 |

FOREIGN PATENT DOCUMENTS

| 313 292 | 4/1989 | European Pat. Off. . |
| 34 17 542 | 11/1984 | Germany . |
| 38 19 490 | 12/1989 | Germany . |
| 39 02 131 | 7/1990 | Germany . |
| 40 09 640 | 6/1991 | Germany . |
| 40 22 407 | 11/1991 | Germany . |
| 40 20 449 | 1/1992 | Germany . |
| 44 12 822 | 10/1995 | Germany . |
| WO95/01897 | 1/1995 | WIPO . |

OTHER PUBLICATIONS

English translation of the International Preliminary Examination Report for PCT/EP97/00179.

Search Report of the German Patent Office Relating to Parent German Patent Application 196 02 363.7.

*Primary Examiner*—Douglas C. Butler
*Attorney, Agent, or Firm*—Rader, Fishman & Grauer, PLLC

[57] ABSTRACT

A brake pressure control system is proposed which operates on the fluid-return principle. This system includes a low pressure accumulator which must be emptied upon termination of a braking operation with brake pressure control. In this way, the emptying period is kept as short as possible. To this end, the pump is driven for a defined period. In this emptying period, the motor is controlled by pulse-width modulation, and the electromotive counterforce is measured in the phases of the control signal in which no voltage is applied to the motor. This counterforce is a standard of the rotational speed of the motor or the rotational speed of the connected pump. When the rotational speed or the rotational speed variation exceeds a given value, this can be considered as an indication that the low pressure accumulator is empty. As soon as such a signal appears, the emptying period is terminated by deactivation of the motor.

5 Claims, 1 Drawing Sheet

BRAKE PRESSURE CONTROL DEVICES

TECHNICAL FIELD

The present invention relates to brake pressure control systems and more particularly relates to vehicle control systems wherein the vehicle brakes can be applied independent of the braking force exerted by the vehicle driver.

BACKGROUND OF THE INVENTION

Typically, a brake pressure control system of this type is an anti-lock system. However, it is also desired to include all other control systems wherein the pressure in the wheel brake can be adjusted independently of the pedal force. One type of a brake pressure control system is referred to as fluid-return principle. A system of this type includes an inlet valve which can close the connection between the master cylinder and the wheel brake cylinders, and an outlet valve which connects the wheel brake cylinder to a low pressure accumulator. The pressure fluid discharged into the low pressure accumulator is returned by a return pump.

The brake pressure can be controlled by opening and closing the inlet valve and the outlet valve according to the specifications of an electronic control system.

Usually, pressure fluid remains in the low pressure accumulator after such a control operation has been completed. This pressure fluid must be removed in a so-called follow-up period of emptying period and returned into the supply reservoir of the system. Typically, the control of a system of this type arranges for a follow-up of the motor which drives the return pump for a defined interval after a braking operation has been terminated (which can be identified by monitoring the brake light switch).

The interval is rated so that even a completely filled low pressure accumulator can reliably be emptied in any case. This condition may be easily realized in terms of circuit technology. However, the disadvantage is that during each braking operation, where brake pressure control has been activated, the motor or the pump still produces noise even after termination of the control for a relatively long interval.

An object of the present invention is to minimize noises. To this end, the present invention discloses monitoring the rotational speed of the pump in the emptying period and disconnecting the pump and terminating the emptying period due to defined criteria with respect to the rotational speed.

This provision permits adapting the emptying time to the actual filling level of the low pressure accumulator. Normally, the emptying time is this way shortened so that disturbing noise is also minimized.

A monitoring operation of this type can be achieved most easily by actuating the motor which drives the pump in a pulse-width modulated fashion in the emptying period, and the rotational speed is measured in the sections of the control signal for the pump where no voltage is applied to the motor.

A simple magnitude which represents the rotational speed of the motor and the pump connected to the motor is achieved by measuring the electromotive counterforce.

The rotational speed itself can be taken into account as a criterion for disconnection of the pump, and the emptying period is terminated by disconnection of the motor as soon as a defined rotational speed is exceeded.

However, it is also possible to take into account the rotational speed increase from measuring point to measuring point, and the emptying period is also terminated after a defined threshold has been exceeded.

BRIEF DESCRIPTION OF THE DRAWING

The FIG. 1 embodiment shows the brake system of a vehicle wherein only one brake circuit is shown.

DETAILED DESCRIPTION OF THE PREFERRED EMBODIMENT

Figure 1:
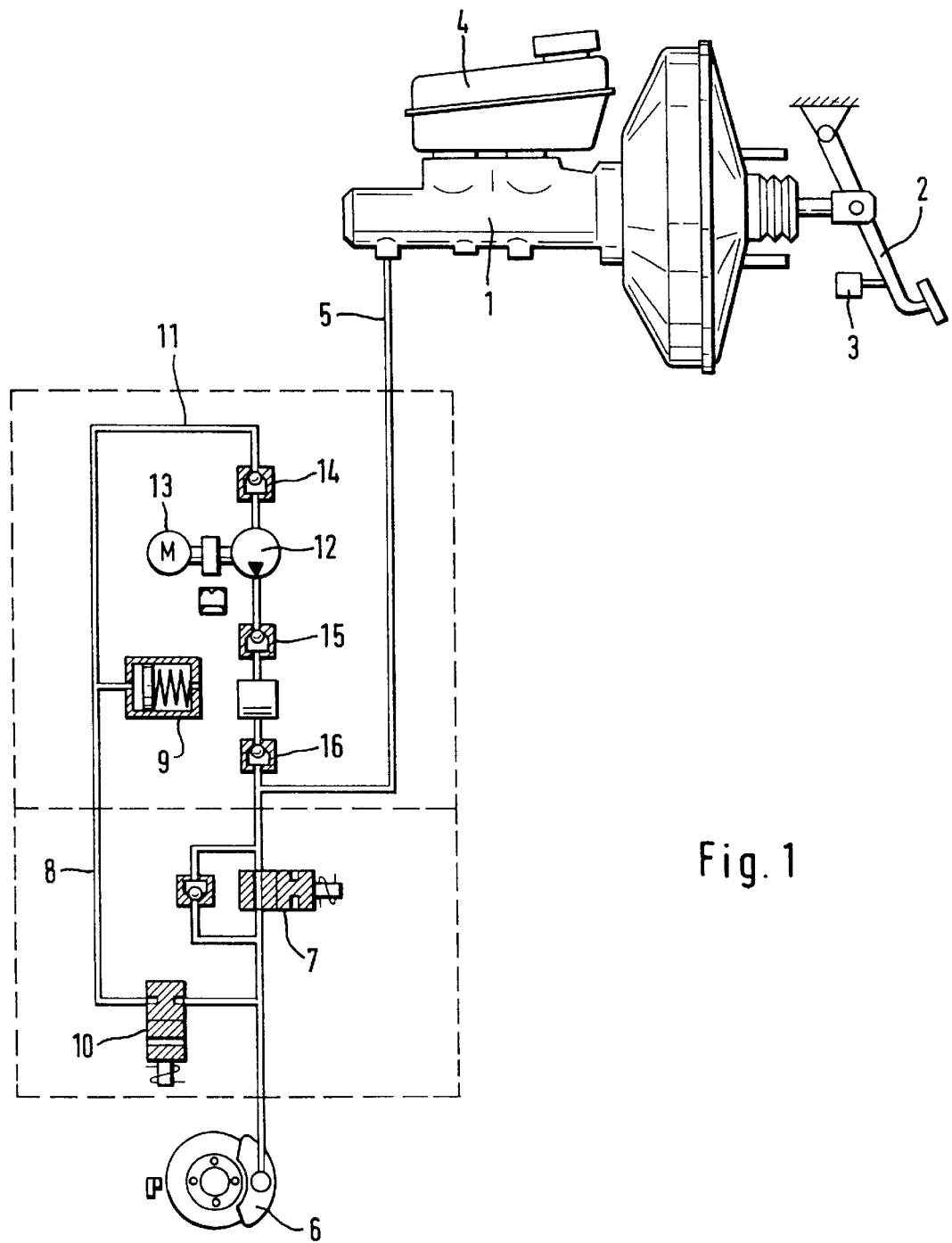

The present system includes a master cylinder 1 which is operated by a pedal 2. A brake light switch 3 is mounted on the pedal 2. The condition of the switch indicates whether the pedal is applied or not.

A supply reservoir 4 is connected to the master cylinder 1 and is connected to the working chambers of the master cylinder and, thus, to the connected brake circuits when the brake pedal is not applied. A brake circuit includes a brake line 5 which connects a working chamber of the master cylinder to a wheel brake 6. Inserted into the line is an inlet valve 7 which is electromagnetically operated and, in its de-energized condition, keeps the brake line open.

The wheel brake 6 is connected to a low pressure accumulator 9 by way of a return line 8, and an outlet valve 10 is inserted into the return line. Outlet valve 10 is closed in its de-energized condition.

The low pressure accumulator 9, by way of a suction line 11, is connected to the suction side of a pump 12 which is driven by a motor 13. The pressure side of the pump 12 is connected to the brake line 5 between the master cylinder 1 and the inlet valve 7 by way of a return valve 16.

The opening pressure of the suction valve 14 of the pump amounts to 1,1 bar approximately, the opening pressure of the pressure valve 15 of the pump amounts to 5,5 bar approximately.

Upon application of the pedal, pressure develops in the brake circuit, and the pressure in the working chamber of the master cylinder 1 corresponds to the pressure in the wheel brake 6. In order to adjust the pressure independently of the pressure in the master cylinder, the inlet or outlet valve 7, 10 is actuated. For pressure reduction, the inlet valve is closed and the outlet valve is opened. Both valves are closed for maintaining the pressure constant, and the outlet valve is closed and the inlet valve is opened for pressure reincrease.

In a pressure reduction period, pressure fluid flows from the wheel brake 6 into the low pressure accumulator 9 and is returned into the master cylinder 1 by way of the pump 12.

The case may occur that pressure fluid still remains in the low pressure accumulator upon termination of a braking operation. This pressure fluid must be removed so that the low pressure accumulator is ready to take up pressure fluid in a pressure reduction period in the case of repeated brake pressure control. It is proposed that the pump 13 is controlled by pulse-width modulation upon termination of a brake pressure control operation, however, at the latest when the brake has been released again. Such brake release can be found out by way of the brake light switch 3. Pulse width modulation is effected in a determined clock. The electromotive counterforce is measured in the periods where no voltage is applied to the motor. This is a standard of the rotational speed of the motor and the connected pump.

The rotational speed of the pump is determined especially by the opening pressure of the pressure valve 15, i.e., at least as long as pressure fluid still prevails which is urged from the low pressure accumulator 9 to the suction side of the pump 12.

As soon as pressure fluid is not applied to the suction side of the pump, the pump runs empty, and the rotational speed is abruptly increased. The emptying period is terminated as soon as this condition is detected. The duration of the emptying period is this way dictated by the filling level of the low pressure accumulator which prevails upon completion of a brake pressure control operation.

In general, the filling level is low so that only short emptying periods will occur.

The inlet valve may remain open in the emptying period. It can be advisable in some cases to close the inlet valve in order to prevent the pressure fluid which is delivered by the pump into the brake line 5 from propagating to the wheel brake. Instead, the pressure fluid must be conducted in any case into the supply reservoir 4 through the connection between the master cylinder and the supply reservoir 4 which is open when the pedal is released.

What is claimed is:

1. Brake pressure control system, comprising:
   a master cylinder which is connected by way of a brake line to at least one wheel brake so that brake pressure is built up when the master cylinder is operated,
   a low pressure accumulator into which pressure fluid is discharged for reducing the pressure in the wheel brake,
   a pump which is connected with its suction side to the low pressure accumulator and with its pressure side to the brake line,
   a device for sensing the actuating condition of the master cylinder which device is used to actuate the pump for emptying the low pressure accumulator when the master cylinder is released and brake pressure control took place, wherein the rotational speed of the pump is monitored in an emptying period, and the emptying period is terminated on command of the rotational speed signal by disconnection of the pump.

2. Brake pressure control systems as claimed in claim 1, wherein the pump is driven by an electric motor, and in that the electric motor is controlled by pulsewidth modulation in the emptying period, and the rotational speed is measured in the sections of the control signal where no voltage is applied to the motor.

3. Brake pressure control systems as claimed in claim 2, wherein the electromotive counterforce of the motor is taken into account in the rotational speed measurement.

4. Brake pressure control system as claimed in claim 1, wherein the emptying period is terminated by deactivation of the motor as soon as the rotational speed exceeds a determined value.

5. Brake pressure control system as claimed in claim 1, wherein the emptying period is terminated by deactivation of the electric motor as soon as the rotational speed variation from measuring point to measuring point exceeds a determined value.

* * * * *